Patented Mar. 11, 1941

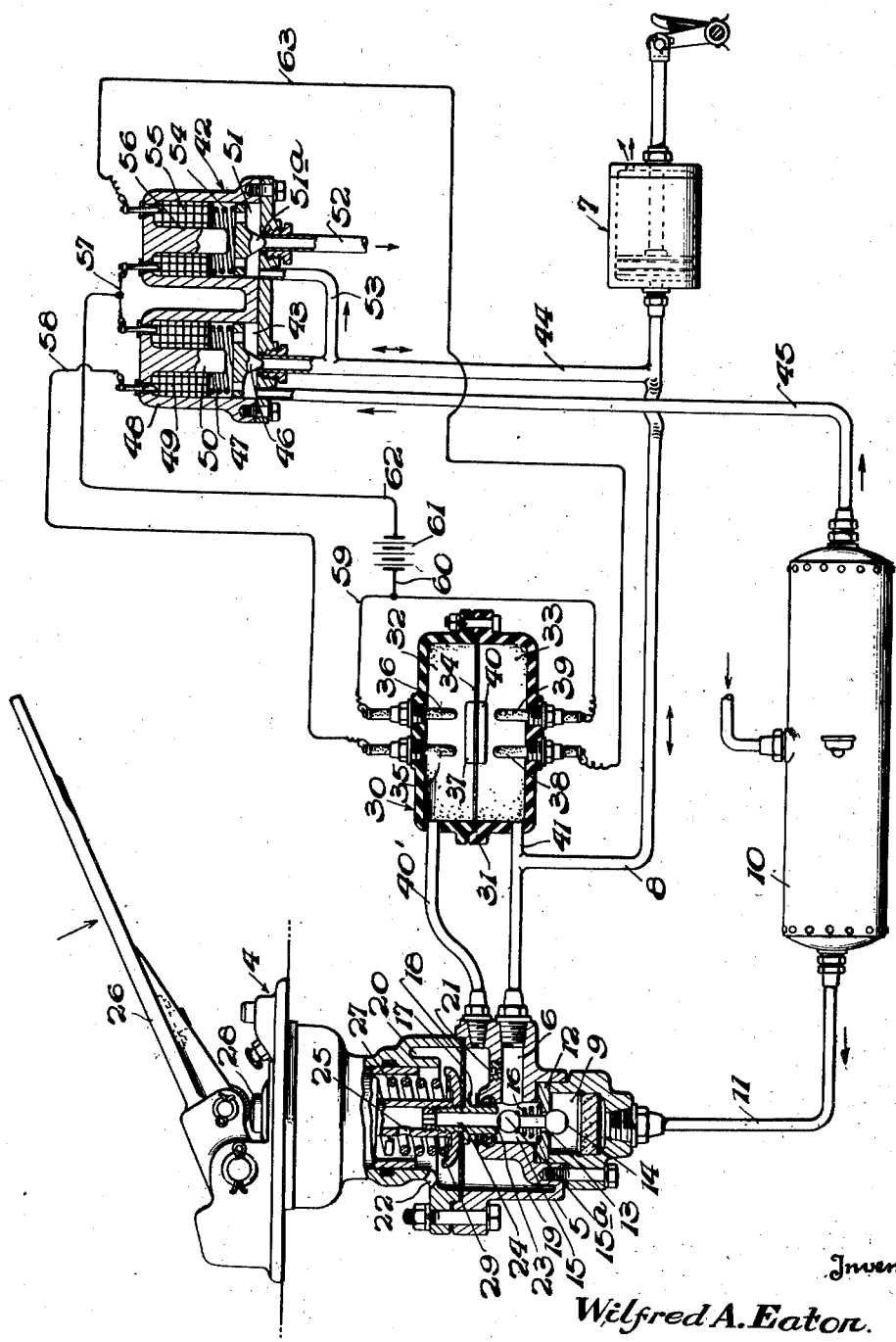

2,234,897

UNITED STATES PATENT OFFICE 2,234,897

BRAKE MECHANISM

Wilfred A. Eaton, Pittsburgh, Pa., assignor to Bendix-Westinghouse Automotive Air Brake Company, Pittsburgh, Pa., a corporation of Delaware Application November 1, 1939, Serial No. 302,451

12 Claims. (Cl. 303—15)

This invention relates to control mechanism for fluid motors, and more particularly to a system for controlling fluid pressure in a fluid motor adapted for the operation of vehicle brakes.

Systems of the above type have previously been proposed making use of electrically-operable valves, commonly known as magnet valves, in conjunction with the operator-controlled valves, hereinafter referred to as brake valves, in order to expedite the supplying and exhausting of fluid pressure to and from fluid motors of the type used for actuating vehicle brakes. Such systems have, however, in many cases, required the use of special and comparatively complicated brake valve structures for effecting the necessary coordinated control of the electrically-operable valves.

It is accordingly an object of the present invention to overcome these difficulties and to provide, in a system of the above described type, controlling means for the magnet valves which may be readily adapted for use in connection with brake valves of the type already in common use.

Brake valves of the type above referred to are frequently provided with a pair of chambers connected by a restricted passage, which acts to create a varying pressure differential between the chambers during operation of the valve, and another object of the invention is the utilization of the pressure differential thus created for controlling the operation of the magnet valves.

Yet another object is to provide, in connection with brake valves of the above type, mechanism for controlling energization of the magnet valves, so constituted as to prevent energization of the magnet valves and consequent loss of electrical energy when the brake valve is in either released or lapped position.

A further object of the invention is the provision, in a control system of the above character, of mechanism so constructed as to permit operation and control of the brakes by the brake valve alone in the event of failure of the supply of electrical energy for operating the magnet valves.

These and other objects of the invention will be more readily apparent when taken in connection with the accompanying drawing, wherein one form of the invention is illustrated. It is to be expressly understood, however, that the drawing is employed for purposes of illustration only, and is not designed as a definition of the limits of the invention, reference for this purpose being had to the appended claims.

In the drawing, the single view is a diagrammatic representation, partially in section, of a fluid motor control system constructed in accordance with the principles of the present invention.

Referring to the drawing, the invention is illustrated as including a self-lapping brake valve 4, which may be of the general type disclosed in the patent to William J. Andres and Roy S. Sanford No. 2,133,275, dated October 18, 1938, having a casing 5 provided with an outlet chamber 6 connected to a fluid motor 7 by means of conduit 8, and an inlet chamber 9 connected to a fluid pressure reservoir 10 by means of a conduit 11. The outlet chamber is separated from the inlet chamber by a partition 12 provided on its lower side with an intake valve seat 13, and communication between the two chambers is normally interrupted by means of an intake valve 14 held against seat 13 by a spring 15 interposed between the upper side of partition 12 and an exhaust valve 15a positioned in the outlet chamber and rigidly connected to the intake valve by a valve stem 16. A valve-operating element 17, normally spaced from exhaust valve 15a, is secured as shown to a flexible diaphragm member 18 carried by the casing and dividing the upper portion thereof into diaphragm and exhaust chambers 19 and 20 respectively, the former chamber being connected with the outlet chamber 6 by a choked passage 21 and the diaphragm chamber being connected to atmosphere by means of an exhaust port 22. An exhaust valve seat 23 is formed at the lower end of valve-operating element 17, and a bore 24 formed in element 17 concentric with the seat normally serves to connect outlet chamber 6 with exhaust chamber 20 through a port 25 leading from the bore 24 to the exhaust chamber. The intake and exhaust valves are readily operated by means of a foot pedal 26 pivotally mounted on a portion of the casing 5 and connected with the valve-operating element 17 through a graduating spring 27 interposed between a plunger 28 actuated by the pedal and a spring seat 29 carried by the element 17.

It will be understood by those familiar with the type of brake valve above described that, when the brake pedal 26 is depressed a predetermined amount and held in such position, the air pressure in chamber 19 acting on the lower side of diaphragm 18 will eventually balance the spring force exerted by the graduating spring 27, at which point the diaphragm will move the valve-operating element 17 to a position at which both the intake and exhaust valves are in closed position, with the pressure in the outlet chamber of the brake valve and in the fluid motor substantially proportional to the degree of movement of the brake valve pedal. As more thoroughly explained in the above referred to patent, the choke 21 between the outlet chamber 6 and the diaphragm chamber 19 serves to delay the flow of fluid pressure from chamber 6 to chamber 19, the result being that, on a sudden application of the brake valve, the pressure in chamber 19 builds up at a much slower rate than the pressure in chamber 6, while, on release of the brake valve pedal, it will be obvious that the reverse action takes place.

The pressure differential just referred to as existing between chambers 6 and 19 is taken advantage of in the present invention to operate a control switch, which in the illustrated embodiment is shown as comprising a switch mechanism 30, having a casing 31, divided into chambers 32 and 33 by diaphragm 34 carried by the casing 31. The upper portion of the casing is provided with a pair of contact members 35 and 36 insulated from the casing, such members being adapted to be connected when contacted by the switch member 37 carried by the diaphragm. The lower portion of the casing is provided with like members 38 and 39, which are adapted to be connected by the switch member 40, carried by the diaphragm. In order that the diaphragm may be responsive to the pressures in chambers 6 and 19, chamber 32 is connected to chamber 19 as by means of a conduit 40', while chamber 33 is connected to the outlet conduit 8 or directly to the chamber 6 as by means of a conduit 41. It will be readily apparent from the foregoing description that, on a sudden application of the brake pedal, the pressure in chamber 6 will be greater than that in chamber 19, as heretofore described, with the result that the fluid pressure in chamber 33 will force the diaphragm 34 upwardly causing the contact member 37 to complete the circuit between the contacts 35 and 36, while a sudden release of the brake pedal will result in the pressure in chamber 19 being greater than that in chamber 6, whereupon the diaphragm 34 will be forced downwardly so as to cause the member 40 to complete the circuit between the contact members 38 and 39.

In order that the supply of fluid pressure may be delivered to and released from the fluid motor 7 as rapidly as possible, there is provided and illustrated in the present invention a double magnet valve 42, having an outlet chamber 43 connected to the fluid motor conduit 8 by means of conduit 44, and to the supply reservoir 10 by means of conduit 45, communication between the outlet chamber 43 and conduit 44 being normally interrupted by means of valve 46 held against the outlet of chamber 43 by means of a spring 47. A casing 48 of suitable magnetic material encloses a magnet coil 49 and, in connection with a center pole piece 50, acts to move the valve to open position whenever the coil is energized. The right hand portion of the magnet valve is provided with an exhaust chamber 51, having a conduit 52 leading to atmosphere, together with a conduit 53 connected to the conduit 44 leading to the fluid motor. An exhaust valve 51a ordinarily closes the outlet to conduit 52, and is held in this position by means of an exhaust valve spring 54, and it will be readily seen that energization of magnet coil 55, carried by casing 48, will cause the pole piece 56 to move valve 51a upwardly so as to connect chamber 51 with the atmosphere, thus exhausting fluid from the fluid pressure motor.

Since fluid motors for operating brake mechanism are ordinarily located at a point remote from the regular brake control valve, a long conduit is necessary to connect the brake valve with the motor. It will be noted that, by the present invention, the use of an ordinary brake valve together with an auxiliary electrically-operated valve provides for the control of fluid pressure to the motor, not only through the regular brake valve, but also through the magnet valve which is located at a point adjacent to the fluid motor 7.

In order that the magnet valve may operate to satisfactorily carry out the function above described, two of the terminals of magnet coils 49 and 55 are connected together by a common connector 57, while the other terminal of the coil 49 is connected to the switch contact 35 by means of a connection 58. The contacts 36 and 39 of the switch 30 are connected together by means of connection 59, and the latter connection is connected to the magnet terminal wire 57 by means of connection 60, battery 61 and connection 62, it being thus apparent that, on upward movement of the diaphragm 34, the member 37 will serve to complete the circuit from the battery 61 to the magnet coil 49 by means of the connections above described, whereupon the valve 46 will be moved upwardly and permit the flow of fluid pressure from reservoir 10 to fluid motor 7 through conduit 45, magnet valve outlet chamber 43, conduit 44 and conduit 8. In like manner, the right hand terminal of magnet coil 55 is connected to the contact 38 of switch 30 by means of a connection 63, this connection being such that, on downward movement of diaphragm 34, electrical energy from the battery 61 will be conducted to magnet coil 55 through connection 62, connection 57, and back to the battery through connection 63, contact 38, contact 40, contact 39, a portion of connection 59 and connection 60.

From the foregoing description, it will be understood that, on downward movement of the brake pedal 26 to effect a brake application, the excess air pressure in outlet chamber 6 of the brake valve will move the switch diaphragm 34 upwardly to connect contacts 35 and 36 and energize the magnet coil 49, which will in turn open the valve 46 and permit fluid under pressure to flow directly from reservoir 10 to the fluid motor through conduit 45, chamber 43, conduit 44 and conduit 8, while release of the brake pedal to effect release of fluid pressure from the motor 7 to conduit 8 will cause the excess pressure in chamber 19 of the brake valve to depress diaphragm 34 and cause contact member 40 to establish the circuit between contacts 38 and 39, whereupon the magnet coil 55 will magnetize the pole piece 56 which in turn will attract the valve 51a, opening the valve and establishing a connection between the fluid motor 7 and atmosphere through conduit 8, conduit 44, conduit 53, chamber 51 and conduit 52. It will be apparent from the foregoing that, whenever application and releasing operations of the manually-operated brake valve are fast enough to cause an appreciable pressure differential between outlet chamber 6 and diaphragm chamber 19, these pressures will actuate the diaphragm 34 of switch 30 in such a manner as to effect operations of the intake and exhaust valves of the magnet valve mechanism which will correspond very closely to the operations of the corresponding valves in the brake valve, while operation of the manually-operated brake valve such as to cause a balance of pressure within the brake valve in chambers 6 and 19 will cause a corresponding balancing action of diaphragm 34, with the result that, when the brake valve comes to lap position, the diaphragm 34 of the switch mechansm will also be in lap position, and both valves of the magnet valve will be closed. It is also to be noted that, with the arrangement shown, no current is consumed from the battery 61 during periods in which the brake valve is in released position or is in applied position with the pressures balanced.

Although the invention has been illustrated and described herein with considerable particularity, it is to be understood that the same is not limited to the form shown but may receive a variety of mechanical expressions, as will readily appear to those skilled in the art. Reference will, therefore, be had to the appended claims for a definition of the limits of the invention.

What is claimed is:

1. In combination with a source of fluid pressure and a fluid motor, of electrically-operable valve means for controlling the flow of fluid pressure between said source and motor, an operator-controlled valvular mechanism for controlling the flow of fluid pressure between the source and motor including inlet and exhaust valves and an operator-controlled pressure-responsive element for operating said valves, an outlet chamber having a connection with the fluid motor, a diaphragm chamber, and a restricted connection between said outlet chamber and diaphragm chamber for effecting a fluid-pressure differential between said chambers during changes of pressure in said outlet chamber, and means including a member responsive to the pressures in said chambers for controlling the operation of said electrically-operable valve means.

2. A fluid motor control system having a fluid motor and a source of fluid pressure, and means for controlling the flow of fluid pressure between the source and the motor including a self-lapping valve mechanism of the type having an outlet chamber connected with the motor, a valve for controlling the flow of fluid pressure between the source and the outlet chamber, a second chamber having a restricted connection with the outlet chamber, and a pressure-responsive member associated with said second chamber and subjected to the pressure therein for controlling the operation of the valve, auxiliary valve means for controlling the flow of fluid pressure between the source and the motor, and means including a second pressure-responsive member subjected to the pressures in both of said chambers for controlling the operation of said auxiliary valve means.

3. A fluid motor control system having a fluid motor and a source of fluid pressure, and means for controlling the flow of fluid pressure between said source and motor including a self-lapping valve mechanism of the type having an outlet chamber connected with the motor, a valve for controlling the flow of fluid pressure between the source and the outlet chamber, a second chamber having a restricted connection with the outlet chamber, and a pressure-responsive member associated with said second chamber and subjected to the pressure therein for controlling operation of the valve, auxiliary valve means for controlling the flow of fluid pressure between the source and the motor, a second connection between said second chamber and outlet chamber, and means including a second pressure-responsive member associated with said second connection and subjected to the pressures in both of said chambers for controlling the operation of the auxiliary valve means.

4. A fluid motor control system having a fluid motor and a source of fluid pressure, and means for controlling the flow of fluid pressure between said source and motor including a self-lapping valve mechanism of the type having an outlet chamber connected with the motor, intake and exhaust valves for controlling the flow of fluid pressure through said outlet chamber, a second chamber having a restricted connection with the outlet chamber, and a pressure-responsive member associated with the outlet chamber and subjected to the pressure therein for controlling the operation of the valves, auxiliary valve means including an outlet chamber connected with the motor and valves for controlling the flow of fluid pressure through said chamber, and means including pressure-responsive means subjected to the pressures in the first named outlet chamber and in said second chamber for controlling the operation of said auxiliary valve means.

5. A fluid motor control system having a fluid motor and a source of fluid pressure, and means for controlling the flow of fluid pressure between said source and motor including a self-lapping valve mechanism of the type having an outlet chamber connected with the motor, valves for controlling the flow of fluid pressure through said chamber, a second chamber having a restricted connection with said outlet chamber, and pressure-responsive means associated with said second chamber and subjected to the pressure therein for controlling the operation of the valves, electrically-operable auxiliary valve means for controlling the flow of fluid pressure between the source and motor, and means for controlling the energization of said electrically-operable auxiliary valve means including a casing and a pressure-responsive member dividing the casing into a pair of chambers, a switch operable by the pressure-responsive member, a connection between one of said pair of chambers and the outlet chamber of the self-lapping valve, and an unrestricted connection between the other of said pair of chambers and the second chamber of the self-lapping valve.

6. The combination with a fluid motor control system having means for controlling the flow of fluid pressure to the motor including an auxiliary valve and a self-lapping valve of the type having a pair of chambers and means for subjecting said chambers to differential pressures during fluid pressure flow controlling operation of the valve and for subjecting the chambers to the pressure in the motor when the valve is lapped, of means controlled by the pressures in both of said chambers for controlling the operation of said auxiliary valve.

7. A fluid motor control system having a fluid motor and a source of fluid pressure, and means for supplying and exhausting fluid pressure to and from said motor including a self-lapping valve mechanism of the type having an outlet chamber connected to the motor, intake and exhaust valves for controlling the flow of fluid pressure through said outlet chamber, a second chamber having a restricted connection with said outlet chamber, and a pressure-responsive member associated with the outlet chamber and subjected to the pressure therein for controlling the operation of the valves, electrically-operable valve mechanism including an outlet chamber connected with the motor and intake and exhaust valves for respectively establishing communication between the source of fluid pressure and the last named outlet chamber and for exhausting fluid pressure from the outlet chamber, and means controlled by the pressure in the outlet chamber of the self-lapping valve mechanism for controlling operation of the intake valve of said electrically-operable valve mechanism and controlled by the pressure in the second chamber of the self-lapping valve mechanism for controlling the operation of the exhaust valve of the electrically-operable valve mechanism.

8. A fluid motor control system having a fluid motor and a source of fluid pressure, and means for supplying and exhausting fluid pressure to and from said motor including a self-lapping valve mechanism of the type having an outlet chamber connected with the motor, an intake valve for establishing communication between said outlet chamber and source, a valve operable for exhausting fluid pressure from said chamber, a second chamber having a restricted connection with said outlet chamber, and means including a pressure-responsive member associated with said second chamber and subjected to the pressure therein for operating and controlling the operation of said valves, auxiliary valve means having an outlet chamber connected with the motor and including individually electrically-operable intake and exhaust valves for respectively establishing communication between said source and outlet chamber and for exhausting fluid pressure from said chamber, a switch for controlling operation of said intake valve, a second switch for controlling the operation of said exhaust valve, and means responsive to an excess of pressure in the outlet chamber of the self-lapping valve mechanism for closing the first named switch and responsive to an excess of pressure in the second chamber of said valve mechanism for closing the second switch.

9. A fluid motor control system having a fluid motor and a source of fluid pressure, and means for supplying and exhausting fluid pressure to and from said motor including a self-lapping valve having an outlet chamber connected to the motor and a second chamber connected to the outlet chamber by a restricted passage, intake and exhaust valves for respectively establishing communication between said source and outlet chamber and exhausting fluid from said outlet chamber, and means including a pressure-responsive member for controlling the operation of said valves, auxiliary valve means having an outlet chamber connected with the motor and intake and exhaust valves for respectively establishing communication between said last named chamber and source and exhausting fluid pressure from said chamber, and means for individually controlling and operating the intake and exhaust valves of said auxiliary valve including means responsive to the pressure in the outlet chamber of the self-lapping valve for controlling operation of the last-named intake valve and responsive to the pressure in the second chamber of the self-lapping valve for controlling operation of said last named exhaust valve.

10. A fluid braking system having a fluid-operated motor, a source of fluid pressure, an electrically-operated application valve for connecting said source and motor, an electrically-operated release valve for connecting said motor to atmosphere, and means for alternately energizing said valves comprising a pressure-responsive switch movable in opposite directions, self-lapping valve means for controlling the operation of said switch and having a chamber adapted to be connected with said source and a second chamber in constant restricted communication with said first chamber, and separate connections between said first and second chambers and said pressure responsive switch for rendering the self-lapping valve controlling action thereon effective.

11. A fluid braking system having a fluid-operated motor, a source of fluid pressure, an electrically-operated application valve for connecting said source and motor, an electrically-operated release valve for connecting said motor to atmosphere, and means for alternately energizing said valves comprising a pressure-responsive switch movable in one direction to energize said application valve and movable in the opposite direction to energize said release valve, and means including a self-lapping brake valve for controlling the operation of said switch, said brake valve having an outlet chamber connected with said motor and adapted to be connected with said source, a second chamber in restricted communication with said first chamber, and means connecting said chambers with said pressure responsive switch for controlling the operation of said switch in accordance with variations of pressure in said chambers during the operation of said self-lapping brake valve.

12. A fluid motor control system having a fluid motor and a source of fluid pressure, means for controlling the supply of fluid pressure to said motor including a valve for connecting said source and motor, auxiliary electrically operable valve means for connecting said source and motor, means including a switch for controlling the energization of said last named valve means, said switch including a casing having a pair of chambers and a pressure responsive member subjected to the pressures in both of said chambers, and means for supplying differential pressures to said chambers including a direct connection between the motor and one of the chambers and a relatively restricted connection between the motor and said other chamber.

WILFRED A. EATON.